3,842,011
PROCESS FOR PREPARING FERROMAGNETIC
CHROMIUM DIOXIDE
Yasuhiko Fukuda, Chiba, and Isao Osada, Kanagawa, Japan, assignors to Nippon Chemical Industrial Co., Ltd., Tokyo, Japan
No Drawing. Continuation of abandoned application Ser. No. 47,891, June 19, 1970. This application Jan. 31, 1973, Ser. No. 328,167
Claims priority, application Japan, June 20, 1969, 44/48,288, 44/48,289, 44/48,290, 44/48,291, 44/48,292, 44/48,293, 44/48,294
Int. Cl. C04b 35/12; C01g 37/02
U.S. Cl. 252—62.51                                    12 Claims

ABSTRACT OF THE DISCLOSURE

A process for preparing a ferromagnetic chromium dioxide comprising the steps of calcining at a temperature of from 250 to 500° C. a mixture of (1) a chromium oxide, wherein the chromium in said chromium oxide has an average valence of greater than 4, and (2) a member selected from the group consisting of a nitrate selected from the group consisting of calcium nitrate, barium nitrate, strontium nitrate, lead nitrate and mixtures thereof, said nitrate being present at a level of at least 0.01 mole per mole of said chromium oxide is disclosed.

---

This is a continuation of application Ser. No. 47,891, filed June 19, 1970 now abandoned.

BACKGROUND OF THE INVENTION

1. Field of the Invention

The present invention relates to a process for preparing a ferromagnetic chromium dioxide having a rutile type of crystalline structure. More particularly, the present invention relates to a process for preparing the desired magnetic chromium dioxide independently of pressure or depending upon pressure.

2. Description of the Prior Art

The preparation method for ferromagnetic chromium dioxide, hitherto publicly known, includes, for example, a method for thermally decomposing chromium trioxide ($CrO_3$) under a high pressure of oxygen, a method of utilizing the self-decomposition pressure of chromium trioxide ($CrO_3$), and the like. However, the above-described methods are effected under super high pressures substantially above 500 atmospheres, and therefore, involve, for example, the danger of explosion and industrial difficulties in handling, apparatus, and material, and further are unsatisfactory in the yield of the desired product, even though the product obtained is excellent in magnetic characteristics.

On the other hand, recently, a method of preparing a magnetic chromium dioxide under a relatively lower pressure has been developed. However, the yield of the desired product is low and the magnetic characteristics of the product are unsatisfactory in value.

As the result of lengthy research on a process for preparing a magnetic chromium dioxide, the present inventors have found a process for preparing a magnetic chromium dioxide ($CrO_2$) using a relatively simple method which is independent of pressure.

The present invention provides a process for preparing a ferromagnetic chromium dioxide, which comprises homogeneously mixing a chromium oxide, wherein the average valence of the chromium is greater than 4, and a nitrate as a fundamental material, heating and calcining the mixture at atmospheric pressure and subsequently purifying it.

Secondly, the present invention provides a process for preparing a ferromagnetic chromium dioxide by heating and calcining the above-described mixture under pressure and subsequently purifying it.

Thirdly, the present invention provides a process for the preparation of a ferromagnetic chromium dioxide by heating and calcining the above-described mixture under reduced pressure, and subsequently purifying it.

Fourthly, the present invention provides a process for obtaining the desired magnetic substance by carrying out any one of the above-described preparation processes in the presence of various metals, and oxides, salts and fluorides thereof as a modifier element.

SUMMARY OF THE INVENTION

The present invention is a process for the preparation of a ferromagnetic chromium dioxide comprising the step of calcining at a temperature of from 250 to 500° C. a mixture of a chromium oxide, wherein the chromium in said chromium oxide has an average valence of greater than 4, and a member selected from the group consisting of non-alkali metal nitrates and mixtures of non-alkali metal nitrates, wherein said nitrate is present at a level of at least 0.01 mole of nitrate per mole of the chromium oxide.

DETAILED DESCRIPTION OF THE INVENTION

The present invention will be described in greater detail hereinafter.

As used herein the term chromium oxide, wherein the average valence of the chromium is greater than 4, describes primarily chromium trioxide ($CrO_3$). However, the term also can include decomposed intermediates, for example, trichromium octoxide ($Cr_3O_8$), chromium hemipentaoxide ($Cr_2O_5$), and the like and mixtures of $CrO_3$, $Cr_3O_8$, $Cr_2O_5$ and $CrO_2$, and the like.

The nitrates, indispensably used as a fundamental constituting component together with the above-described chromium oxides includes nitrates of metals other than the alkali metal nitrates, i.e., non-alkali metal nitrates. For example, the nitrates of the alkaline earth metals, such as berylium nitrate, magnesium nitrate, calcium nitrate, strontium nitrate and barium nitrate, and the like, and the metallic nitrates, such as lead nitrate, thorium nitrate, thallium nitrate, copper nitrate, chromium nitrate, manganese nitrate, ferric nitrate, cobalt nitrate, nickel nitrate, zinc nitrate, and stannic nitrate, and the like can be used. The anhydrides or the hydrates of these nitrates can be, of course, used, also.

Of these nitrates, a nitrate having a melting point or decomposition point of above about 150° C. is desired. Particularly the nitrates of calcium, strontium, barium and lead, and the like are preferred, and shows an excellent effect in the yield of the desired object product.

In the present invention, the presence of a nitrate, as described above, is indispensable for the above chromium compound. However, use of components which will form the chromium compound and the nitrate can be used. This is a preferred approach in the method of the present invention.

For example, although other metals can be used, when nitric acid is added to a chromate and/or bichromate of calcium, barium, strontium, and lead and the like, particularly, chromium trioxide and the corresponding nitrate are essentially formed. The ratio of the chromate or the bichromate to the nitric acid can be stoichiometric to form chromium trioxide, however, an excess, for example, up to four times the stoichiometric amount, is acceptable.

The ratio can be controlled by adding the chromium compound, wherein the average valence of the chromium is above 4. Additionally, in this case the concentration of nitric acid used is preferably about 5%, by weight, although this concentration is not critical.

The blending ratio of the chromium oxide and the above described metallic nitrate is preferably above about 0.01 mole of nitrate per mole of chromium oxide, although this ratio can be varied according to the types of chromium oxide and nitrate used, and the treating conditions, such as pressure, and the like, employed.

Where less than the above value is used, the addition of nitrate is substantially ineffective, and, alternatively, the blending of the excess nitrate with the chromium compound is not reversely affected. However, the ratio should be decided from a practical industrial standpoint. Therefore, in the present invention, the above described value can be above about 0.01 mole, preferably in the range of 0.05 to 1 mole. However, from the above meaning, the ratio can be varied within the scope of the present invention.

Generally, when chromium trioxide, alone, is thermally decomposed, the stable domain of chromium dioxide is hardly existent but the trioxide becomes chromium sesquioxide. Therefore, it is generally desired to control the decomposition of the chromium trioxide under a high partial pressure of oxygen to form a domain for producing chromium dioxide. However, this is very difficult technically. However, according to the present invention, surprisingly, the domain is formed by adding a nitrate, which is the above described fundamental constituting component, to the above chromium oxide. It should be noted that, the presence of a very small fraction of the stoichiometric amount of the nitrate has an effect on the formation of this stable domain.

Accordingly, in the present invention, chromium dioxide can be formed substantially independently of the oxygen pressure or an inert gas such as nitrogen and argon.

According to experiments by the present inventors, surprisingly the desired product can be formed even under reduced pressure, and, therefore, the formation of the product is carried out more easily under the pressure conditions of the above gas.

Therefore, the satisfactory amount of nitrate to be added to the above chromium oxide is that amount which is necessary and sufficient to form a stable domain of chromium dioxide under the desired pressure condition. Thus, the quantitative relationship between the oxide of chromium, wherein the average valence of the chromium is greater than 4, and the nitrate, which is en essential component, is not stoichiometrically limited but varies within the above meaning.

However, where a metallic nitrate, other than calcium-, barium-, strontium-, lead-nitrate, and the like is used, the nitrate is preferably employed in a relatively larger amount and/or under super-atmospheric condition from the standpoint of the yield of the ferromagnetic chromium dioxide.

According to the present invention, the desired ferromagnetic chromium dioxide can be obtained by blending the above described two indispensable and essential ingredients or by preparing a material substantially constituting such ingredients by a method as described below. However, in some cases, various improving agents, that is, aids, can be used to improve the quality of the magnetic material.

Alkali metals and/or alkali metal compounds are preferred as the first ingredient of an improving agent for the ferromagnetic chromium dioxide as they serve the function of improving the crystal form of the chromium dioxide. Such materials include lithium, sodium, potassium, rubidium, and cesium, and their chromates, bichromates, nitrates, halides, such as the chlorides, bromides, and iodides, halogenates, perhalogenates and oxides, and the like. In particular, the chromates, bichromates and nitrates are preferred.

Next, as the second ingredient of the improving agent which serve the function of improving the magnetic characteristics of the chromium dioxide, examples are metals such as antimony, tellurium, nickel, chromium, manganese, iron, cobalt, thallium, titanium, vanadium, bismuth, cadmium, germanium, tin, and molybdenum, and the like, and their oxides; fluorides of iron, cobalt, zinc, nickel and magnesium; sulfates of manganese, cobalt, chromium and nickel. Among these materials, particularly metals, such as antimony, tin, tellurium and the like, and their oxides are preferable. Of course, two or more of these improving agents can be used in combination. The combination of the first ingredient and the second ingredient as described above is particularly preferred in the preparation of the ferromagnetic chromium dioxide according to the present invention.

Also, metals and metallic compounds, other than those as described above, can be added to increase the magnetic characteristics somewhat, particularly the coercive force. Use of these additives is known in the prior art high pressure processes for preparing the ferromagnetic chromium dioxide. The additive to be added is effective even if added in a slight amount in comparison with the above chromium dioxide. The amount is determined depending upon the use of desired product. Excess of the additive is rarely harmful since it is removed as an impurity in the purification process, described hereinafter. However, both the first and the second ingredients of the improving agent are considered to be sufficient when present at about 0.001 mole, preferably 0.05 to 0.5 mole, per mole of chromium oxide. When using the process of the present invention, in addition to the above two ingredients, most of the heavy metals and their compounds can be applied as an improving agent to improve the coercive force. Thus, the composition constituted, as described above is mixed until homogeneous. In this case, the mixing can be carried out in the presence or absence of a small amount of water depending upon the types of constituents and the like. The order of addition of each constituent is immaterial.

Summarizing, it is satisfactory if at least 0.01 mole of nitrate is uniformly blended with 1 mole of chromium oxide and, subsequently, the mixture is dried and heated to obtain a ferromagnetic chromium dioxide independently of pressure. In this case, the heating is from about 350 to 500° C. open to the atmosphere. The temperature is preferably at from 400 to 440° C. in the absence of an improving agent, but is at from 370 to 410° C. in the presence of an improving agent. Also, in heating at a pressure or under a reduced pressure, although the temperature under said pressure can be a temperature corresponding to a value in the range of the desired temperature under ordinary pressure, since the desired temperature condition is varied depending upon the pressure condition, a temperature of from 250 to 500° C., preferably from 300 to 500° C. is satisfactory independently of pressure.

In the case of a high pressure, the limit should be established from an industrial viewpoint. For example, a pressure of 500 to 1000 atm. or more can be employed. Usually, from the standpoint of materials, apparatus, and the like, about 2000 atm. is sufficient. On the other hand, an extremely reduced pressure should be avoided because it is considered to promote the decomposition resulting in a decrease in the yield of chromium dioxide and a deterioration in its quality, up to about 400 mm. Hg is considered to be a practical range. In the case of elevating the temperature, the elevating velocity can be relatively increased up to from about 150 to 210° C. However, at the higher temperatures, the temperature is elevated, preferably gradually. Therefore, the time required for heating is varied depending on the conditions, although it usually ranges from 0.5 to 50 hours. In this case, of course, oxygen gas or an inert gas such as nitrogen and argon can be introduced, or a self-decomposition pressure can be utilized.

Thus, a chromium dioxide can be obtained. However, it contains some impurities which are removed by purification. Crude chromium dioxide so obtained can be crushed, if necessary, and washed with a mineral acid, such as nitric acid, hydrochloric acid, or phosphoric acid, subsequently washed with water or an appropriate organic solvent such as acetone, and then dried to obtain a high purity ferromagnetic chromium dioxide. Nitric acid is particularly preferred as the mineral acid. Its concentration is not critical although a higher concentration is preferred. A nitric acid concentration of above 5%, by weight, is sufficient.

Thus, according to the present invention, a ferromagnetic chromium dioxide can be obtained from a chromium oxide, wherein the chromium has an average valence of above 4, and a nitrate, as an essential component, or a component substantially forming them, and if necessary, by using various additives as an improving agent together therewith independently of pressure. In the process of the present invention, the blending ratio of each component, calcination condition, types of improving agent, and other treating conditions can be applied in an extremely broad range. In addition, according to the process of the present invention, the chromium dioxide can be obtained in a high yield.

The present invention will be further illustrated by reference to the following Examples, which are not to be interpreted as limiting the present invention:

Herein, the magnetization characteristics of the chromium dioxide was measured using an auto-recording apparatus for DC magnetization characteristics. The principle is as follows:

The auto-recording apparatus for DC magnetization characteristics is equipped with a magnetic flux integral circuit (combined with Brockman's and Miller's integral circuits) and a magnetizer. The exciting coil is wound on the primary side of a sample and the search coil is wound on the secondary side. The equipment is so designed that the voltage induced to the secondary coil by the magnetization of the primary coil is integrated by the high gain DC amplifier and RC integrating circuit. The magnetic flux which is obtained from the output of integrator and the magnetizing current of the primary coil are automatically recorded by an X-Y recorder.

EXAMPLE 1

|  | Parts |
| --- | --- |
| Chromium Trioxide, $CrO_3$ | 100 |
| Calcium Nitrate, $Ca(NO_3)_2 \cdot 4H_2O$ | 25 |

The above substances were uniformly mixed with a large amount of water and then dried, and were heated at atmospheric pressure at a temperature elevation rate of 7.5° C./min. and maintained at 440° C. for 1.5 hours. The crude product so obtained was crushed, thereafter washed with 30% nitric acid, subsequently washed with water, washed with acetone, and then dried to obtain a purified ferromagnetic chromium dioxide.

By X-ray diffraction, this product was found to be a ferromagnetic chromium dioxide having a rutile type of crystal structure.

Magnetization Characteristics

| Saturation ($\delta_s$) | gauss | 1300 |
| --- | --- | --- |
| Remanence ($\delta_r$) | do | 110 |
| Coercive Force (Hc) | oe | 44 |

EXAMPLE 2

|  | Parts |
| --- | --- |
| Chromium Trioxide, $CrO_3$ | 100 |
| Strontium Nitrate, $Sr(NO_3)_2$ | 21 |

These substances were mixed uniformly, and thereafter, were heated at atmospheric pressure at a rate of 7.5° C./min. and maintained at 440° C. for 1.5 hours. The crude product so obtained was crushed, washed with concentrated nitric acid, subsequently washed with sufficient water and then with acetone, and dried to obtain a purified ferromagnetic chromium dioxide.

By X-ray diffraction, this product had a rutile-type crystal structure.

Magnetization Characteristics

| Saturation ($\delta_s$) | gauss | 980 |
| --- | --- | --- |
| Remanence ($\delta_r$) | do | 100 |
| Coercive Force (Hc) | oe | 50 |

EXAMPLE 3

|  | Parts |
| --- | --- |
| Chromium Trioxide, $Cr_3O$ | 100 |
| Lead Nitrate, $Pb(NO_3)_2$ | 33 |

These were mixed uniformly with a small amount of water, subsequently dried, calcined under the same conditions as used in Example 1, and then purified to obtain a high purity ferromagnetic chromium dioxide.

Magnetization Characteristics

| Saturation ($\delta_s$) | gauss | 1120 |
| --- | --- | --- |
| Remanence ($\delta_r$) | do | 110 |
| Coercive Force (Hc) | oe | 46 |

EXAMPLE 4

|  | Parts |
| --- | --- |
| Chromium Trioxide, $CrO_3$ | 100 |
| Barium Nitrate, $Ba(NO_3)_2$ | 16 |

These were mixed uniformly with a small amount of water, dried, heated at a rate of 5° C./min., and maintained at about 410° C. for 2 hours at atmospheric pressure, and then were purified in the same manner as used in Example 1 to obtain a high purity ferromagnetic chromium dioxide.

Magnetization Characteristics

| Saturation ($\delta_s$) | gauss | 750 |
| --- | --- | --- |
| Remanence ($\delta_r$) | do | 80 |
| Coercive Force (Hc) | oe | 30 |

EXAMPLE 5

|  | Parts |
| --- | --- |
| Chromium Trioxide, $CrO_3$ | 100 |
| Barium Nitrate, $Ba(NO_3)_2$ | 13 |
| Strontium Nitrate, $Sr(NO_3)_2$ | 10.5 |

These were mixed uniformly with a small amount of water, dried, heating at a rate of 7° C./min., and then at a rate of 1° C./min. to 450° C. at atmospheric pressure and maintained at this temperature for 30 minutes. The crude product was purified in the same manner as used in Example 1 to obtain a high purity ferromagnetic chromium dioxide.

Magnetization Characteristics

| Saturation ($\delta_s$) | gauss | 1108 |
| --- | --- | --- |
| Remanence ($\delta_r$) | do | 93 |
| Coercive Force (Hc) | oe | 51 |

EXAMPLE 6

|  | Parts |
| --- | --- |
| Chromium Trioxide, $CrO_3$ | 100 |
| Strontium Nitrate, $Sr(NO_3)_2$ | 11 |
| Lead Nitrate, $Pb(NO_3)_2$ | 17 |

The mixture was treated under the same conditions as used in Example 5 and purified to obtain a high purity ferromagnetic chromium dioxide.

Magnetization Characteristics

| Saturation ($\delta_s$) | gauss | 1041 |
| --- | --- | --- |
| Remanence ($\delta_r$) | do | 106 |
| Coercive Force (Hc) | oe | 47 |

EXAMPLE 7

|  | Parts |
| --- | --- |
| Chromium Trioxide, $CrO_3$ | 100 |
| Barium Nitrate, $Ba(NO_3)_2$ | 15 |
| Calcium Nitrate, $Ca(NO_3)_2 \cdot 4H_2O$ | 8 |

This mixture was treated under the same condition as used in Example 5 and purified to obtain a high purity ferromagnetic chromium dioxide.

Magnetization Characteristics

| | |
|---|---|
| Saturation ($\delta_s$) gauss | 1276 |
| Remanence ($\delta_r$) do | 150 |
| Coercive Force (Hc) oe | 47 |

EXAMPLE 8

| | Moles |
|---|---|
| Chromium Trioxide, $CrO_3$ | 9 |
| Lead Chromate, $PbCrO_4$ | 1 |
| Conc. Nitric Acid, $HNO_3$ | 2.3 |
| Water | 1 |

The mixture was uniformly mixed, gradually heated and dried, subsequently heated at a rate of 3° C./min. to 400° C. and maintained at this temperature for about 1 hour at atmospheric pressure. The product thus obtained was purified in the same manner as used in Example 1 to obtain a high purity ferromagnetic chromium dioxide which was shown to have a rutile-type crystal structure by X-ray diffraction.

Magnetization Characteristics

| | |
|---|---|
| Saturation ($\delta_s$) gauss | 1130 |
| Remanence ($\delta_r$) do | 98 |
| Coercive Force (Hc) oe | 39 |

EXAMPLE 9

| | Moles |
|---|---|
| Chromium Trioxide, $CrO_3$ | 6 |
| Barium Bichromate, $Ba_2Cr_2O_7$ | 1 |
| Calcium Chromate, $CaCrO_4$ | 1 |
| Strontium Chromate, $SrCrO_4$ | 1 |
| Conc. Nitric Acid, $HNO_3$ | 6.5 |
| Water | 3 |

The mixture was treated in the same manner as used in Example 1, and purified to obtain a high purity ferromagnetic chromium dioxide.

Magnetization Characteristics

| | |
|---|---|
| Saturation ($\delta_s$) gauss | 987 |
| Remanence ($\delta_r$) do | 101 |
| Coercive Force (Hc) oe | 45 |

EXAMPLE 10

| | Parts |
|---|---|
| Chromium Trioxide, $CrO_3$ | 20 |
| Barium Nitrate, $Ba(NO_3)_2$ | 5.3 |
| Potassium Nitrate, $KNO_3$ | 5.3 |

These were mixed uniformly with a small amount of water and dried, subsequently heated at atmospheric pressure at a rate of 3° C./min. to 410° C., maintained at this temperature for 30 minutes, and then purified in the same manner as used in Example 1 to obtain a high purity ferromagnetic chromium dioxide.

Magnetization Characteristics

| | |
|---|---|
| Saturation ($\delta_s$) gauss | 745 |
| Remanence ($\delta_r$) do | 75 |
| Coercive Force (Hc) oe | 3 |

EXAMPLE 11

| | Parts |
|---|---|
| Chromium Trioxide, $CrO_3$ | 20 |
| Barium Nitrate, $Ba(NO_3)_2$ | 5.3 |
| Antimony Oxide, $Sb_2O_3$ | 1 |
| Potassium Bichromate, $K_2Cr_2O_7$ | 0.5 |
| Potassium Nitrate, $KNO_3$ | 0.5 |
| Tin Metal, Sn | 1 |

These were mixed uniformly with a small amount of water and dried, subsequently heated at atmospheric pressure at a rate of 3° C./min. to 420° C. and maintained at this temperature for 3 minutes. The product thus obtained was purified in the same manner as used in Example 1 to obtain a high purity ferromagnetic chromium dioxide.

Magnetization Characteristics

| | |
|---|---|
| Saturation ($\delta_s$) gauss | 960 |
| Remanence ($\delta_r$) do | 210 |
| Coercive Force (Hc) oe | 120 |

EXAMPLE 12

| | Mole |
|---|---|
| Chromium Trioxide, $CrO_3$ | 1 |
| Barium Nitrate, $Ba(NO_3)_2$ | 0.1 |
| Potassium Nitrate, $KNO_3$ | 0.05 |
| Antimony Oxide, $Sb_2O_3$ | 0.017 |
| Tellurium Metal, Te | 0.04 |

These were mixed uniformly and heated at atmospheric pressure at a rate of 3° C./min. to 310° C., subsequently at a rate of 0.3° C./min. to 390° C., and maintained at this temperature for 35 minutes. The product thus obtained was purified in the same manner as used in Example 1 to obtain a high purity ferromagnetic chromium dioxide.

Magnetization Characteristics

| | |
|---|---|
| Saturation ($\delta_s$) gauss | 960 |
| Remanence ($\delta_r$) do | 400 |
| Coedcive Force (Hc) oe | 200 |

Particle Form

| | |
|---|---|
| Short Axis | $0.2\mu$ |
| Long Axis | $1\mu$ |
| Axis Ratio | 5:1 |

Purity

Above 96%.

EXAMPLE 13

| | Mole |
|---|---|
| Chromium Trioxide, $CrO_3$ | 1 |
| Barium Nitrate, $Ba(NO_3)_2$ | 0.1 |
| Rubidium Nitrate, $RbNO_3$ | 0.034 |
| Antimony Oxide, $Sb_2O_3$ | 0.017 |
| Tellurium Metal, Te | 0.04 |

The mixture was heated at atmospheric pressure at a rate of 3° C./min. to about 210° C., subsequently at a rate of 0.3° C./min. to 380° C., and the calcined product was removed immediately when the temperature reached to 380° C. The product was purified in the same manner as used in Example 1 to obtain a high purity ferromagnetic chromium dioxide.

Magnetization Characteristics

| | |
|---|---|
| Saturation ($\delta_s$) gauss | 953 |
| Remanence ($\delta_r$) do | 415 |
| Coercive Force (Hc) oe | 250 |

Particle Form

| | |
|---|---|
| Short Axis | $0.2\mu$ |
| Long Axis | $1\mu$ |
| Axis Ratio | 5:1 |

EXAMPLE 14

| | Mole |
|---|---|
| Chromium Trioxide, $CrO_3$ | 1.0 |
| Lead Nitrate, $Pb(NO_3)_2$ | 0.15 |
| Rubidium Nitrate, $RbNO_3$ | 0.034 |
| Antimony Oxide, $Sb_2O_3$ | 0.017 |
| Tellurium Metal, Te | 0.04 |

These were mixed uniformly with a small amount of water and heated at a rate of 3° C./min. to 210° C. at ordinary pressure, subsequently at a rate of 0.3° C./min. to 380° C., and then, after maintaining the mixture at 380° C. for about 5 minutes, the calcined product was removed. The product obtained was crushed and, thereafter, was washed with 30% $HNO_3$, sufficiently washed with water and then washed with acetone. After washing, the product was dried to obtain a high purity ferromagnetic chromium dioxide.

Magnetization Characteristics

Saturation ($\delta_s$) _____ gauss__ 930
Remanence ($\delta_r$) _____ do____ 405
Coercive Force (Hc) _____ oe__ 230

In the following Examples, only the conditions of operation are shown since the ferromagnetic chromium dioxides were obtained by the same experimental operations.

EXAMPLE 15

| | Mole |
|---|---|
| Chromium Trioxide, $CrO_3$ | 1.0 |
| Calcium Nitrate, $Ca(NO_3)_2$ | 0.15 |
| Potassium Nitrate, $KNO_3$ | 0.025 |
| Antimony Oxide, $Sb_2O_3$ | 0.017 |
| Tin Metal, Sn | 0.04 |

Treatment Condition

Pressure _____ Atmospheric pressure.
Heating Rate _____ 3° C./min. to 420° C.
Maintaining Time _____ At 420° C. for 5 min.

Purification Conditions

15% $HNO_3$ solution, water, and acetone.

Magnetization Characteristics

Saturation ($\delta_s$) _____ gauss__ 954
Remanence ($\delta_r$) _____ do____ 196
Coercive Force (Hc) _____ oe__ 111

EXAMPLE 16

| | Mole |
|---|---|
| Chromium Trioxide, $CrO_3$ | 1.0 |
| Strontium Nitrate, $Sr(NO_3)_2$ | 0.1 |
| Sodium Bichromate, $Na_2Cr_2O_7 \cdot 2H_2O$ | 0.05 |
| Antimony Oxide, $Sb_2O_3$ | 0.017 |
| Tellurium Metal, Te | 0.04 |

Treatment Condition

Pressure _____ Atmospheric pressure.
Rate of Temperature
  Elevation _____ 3° C./min. to 310° C.;
                           0.3° C./min. to 390° C.
Maintaining Time _____ 35 minutes at 390° C.

Purification Condition

Washed with 40% $HNO_3$ solution, water, and acetone in order.

Magnetization Characteristics

Saturation ($\delta_s$) _____ gauss__ 980
Remanence ($\delta_r$) _____ do____ 415
Coercive Force (Hc) _____ oe__ 210

EXAMPLE 17

| | Mole |
|---|---|
| Chromium Trioxide, $CrO_3$ | 1.0 |
| Calcium Chromate, $CaCrO_4$ | 0.1 |
| Nitric Acid, $HNO_3$ | 0.4 |

Treatment Condition

Pressure _____ Atmospheric pressure.
Rate of Temperature Elevation _ 7.5° C./min.
Maintaining Time _____ 90 minutes at 440° C.

Purification

Washed with 60% $HNO_3$ solution, water and acetone in order.

Magnetization Characteristics

Saturation ($\delta_s$) _____ gauss__ 1320
Remanence ($\delta_r$) _____ do____ 112
Coercive Force (Hc) _____ oe__ 48

EXAMPLE 18

| | Mole |
|---|---|
| Chromium Trioxide, $CrO_3$ | 1.0 |
| Strontium Chromate, $SrCrO_4$ | 0.1 |
| Nitric Acid, $HN_3$ | 0.4 |

Treatment

Pressure _____ Atmospheric pressure.
Rate of Temperature Elevation _ 7.5° C./min.
Maintaining Time _____ 90 minutes at 440° C.

Purification

Washing with 30% $HNO_3$, water, and acetone in order.

Magnetization

Saturation ($\delta_s$) _____ gauss__ 930
Remanence ($\delta_r$) _____ do____ 116
Coercive Force (Hc) _____ oe__ 43

EXAMPLE 19

| | Mole |
|---|---|
| Barium Bichromate, $Ba_2Cr_2O_7$ | 1 |
| Lead Chromate, $PbCrO_4$ | 1 |
| Nitric Acid (40%), $HNO_3$ | 4 |

Treatment

Pressure _____ Atmospheric pressure.
Rate of Temperature Elevation _ 7.5° C./min.
Maintaining Time _____ 90 minutes at 440° C.

Purification

Washing with 15% $HNO_3$, water, and acetone in order.

Magnetization Characteristics

Saturation ($\delta_s$) _____ gauss__ 1200
Remanence ($\delta_r$) _____ do____ 85
Coercive Force (Hc) _____ oe__ 40

EXAMPLE 20

| | Mole |
|---|---|
| Chromium Trioxide, $CrO_3$ | 1.0 |
| Thorium Nitrate, $Th(NO_3)_4$ | 0.5 |
| Strontium Nitrate, $Sr(NO_3)_2$ | 0.5 |

Treatment

Pressure _____ Atmospheric pressure.
Rate of Temperature
  Elevation _____ 7.5° C./min. to 210° C.; 0.3° C./
                      min. to 430° C.
Maintaining Time ____ 60 min.

Purification

Washing with 40% $HNO_3$, water and acetone in order.

Magnetization Characteristics

Saturation ($\delta_s$) _____ gauss__ 980
Remanence ($\delta_r$) _____ do____ 79
Coercive Force (Hc) _____ oe__ 41

EXAMPLE 21

| | Mole |
|---|---|
| Chromium Trioxide, $CrO_3$ | 1.0 |
| Nickel Nitrate, $Ni(NO_3)_2 \cdot 6H_2O$ | 0.6 |
| Thallium Nitrate, $TlNO_3$ | 0.06 |

Treatment

Pressure _____ Atmospheric pressure.
Rate of Temperature
  Elevation _____ 7.5° C./min. to 200° C.; 0.4° C./
                      min. to 430° C.
Maintaining Time ____ 10 minutes.

Purification

Washing with conc. $HNO_3$ solution, water and acetone in order.

Magnetization Characteristics

Saturation ($\delta_s$) _____ gauss__ 1860
Remanence ($\delta_r$) _____ do____ 113
Coercive Force (Hc) _____ oe__ 27

EXAMPLE 22

| | Mole |
|---|---|
| Chromium Trioxide, $CrO_3$ | 1.0 |
| Lead Nitrate, $Pb(NO_3)_2$ | 0.1 |
| Potassium Nitrate, $KNO_3$ | 0.5 |
| Antimony Oxide, $Sb_2O_3$ | 0.017 |
| Tellurium Metal, Te | 0.04 |

Treatment

Pressure _____ Control to 450 mm. Hg.
Rate of Temperature
  Elevation _____ 3° C./min. to 310° C.; 0.3° C./min. to 390° C.
Maintaining Time ___ 35 min. at 390° C.

Purification

Washing with 15% $HNO_3$, water and acetone in order.

Magnetization Characteristics

Saturation ($\delta_s$) _____ gauss__ 928
Remanence ($\delta_r$) _____ do____ 366
Coercive Force (Hc) _____ oe__ 157

EXAMPLE 23

| | Mole |
|---|---|
| Chromium Trioxide, $CrO_3$ | 1.0 |
| Strontium Nitrate, $Sr(NO_3)_2$ | 0.2 |
| Rubidium Nitrate, $RbNO_3$ | 0.034 |
| Antimony Oxide, $Sb_2O_3$ | 0.017 |
| Tellurium Metal, Te | 0.04 |

Treatment

Pressure _____ Control to 400 mm. Hg.
Rate of Temperature
  Elevation _____ 3° C./min. to 210° C.; 0.3° C./min. to 380° C.
Maintaining Time ___ 50 minutes at 380° C.

Purification

Washing with 15% $HNO_3$, water, and acetone in order.

Magnetization Characteristics

Saturation ($\delta_s$) _____ gauss__ 903
Remanence ($\delta_r$) _____ do____ 385
Coercive Force (Hc) _____ oe__ 180

EXAMPLE 24

| | Mole |
|---|---|
| Chromium Trioxide, $CrO_3$ | 1.0 |
| Lead Nitrate, $Pb(NO_3)_2$ | 0.1 |
| Sodium Nitrate, $NaNO_3$ | 0.025 |
| Antimony Trioxide, $Sb_2O_3$ | 0.017 |
| Tin Metal, Sn | 0.04 |

Treatment

Pressure _____ Control to 20 atm. in a pressure vessel.
Rate of Temperature
  Elevation _____ 3° C./min. to 420° C.
Maintaining Time ___ 5 min. at 420° C.

Purification

Washing with 30% $HNO_3$, water, and acetone in order.

Magnetization Characteristics

Saturation ($\delta_s$) _____ gauss__ 955
Remanence ($\delta_r$) _____ do____ 202
Coercive Force (Hc) _____ oe__ 109

EXAMPLE 25

| | Mole |
|---|---|
| Chromium Trioxide, $CrO_3$ | 1.0 |
| Calcium Nitrate, $Ca(NO_3)_2 \cdot 4H_2O$ | 0.1 |
| Rubidium Nitrate, $RbNO_3$ | 0.05 |
| Antimony Oxide, $Sb_2O_3$ | 0.017 |
| Tellurium Metal, Te | 0.04 |

Treatment

Pressure _____ Control to 2 atm. in a pressure vessel.
Rate of Temperature Elevation _____ 3° C./min. to 310° C.; 0.3° C./min. to 390° C.
Maintaining Time _____ 35 minutes at 390° C.

Purification

Washing with 15% $HNO_3$, water, and acetone in order.

Magnetization Characteristics

Saturation ($\delta_s$) _____ gauss__ 946
Remanence ($\delta_r$) _____ do____ 388
Coercive Force (Hc) _____ oe__ 186

EXAMPLE 26

| | Mole |
|---|---|
| Chromium Trioxide, $CrO_3$ | 1.0 |
| Strontium Nitrate, $Sr(NO_3)_2$ | 0.1 |
| Potassium Nitrate, $KNO_3$ | 0.25 |

Treatment

Pressure _____ Control to 5 atm. in a pressure vessel.
Rate of Temperature Elevation _____ 3° C./min. to 410° C.
Maintaining Time _____ 30 minutes at 410° C.

Purification

Washing with 60% $HNO_3$, water, and acetone in order.

Magnetization Characteristics

Saturation ($\delta_s$) _____ gauss__ 654
Remanence ($\delta_r$) _____ do____ 66
Coercive Force (Hc) _____ oe__ 28

EXAMPLE 27

| | Mole |
|---|---|
| Chromium Trioxide, $CrO_3$ | 1.0 |
| Calcium Nitrate, $Ca(NO_3)_2 \cdot 4H_2O$ | 0.1 |
| Rubidium Nitrate, $RbNO_3$ | 0.034 |
| Antimony Oxide, $Sb_2O_3$ | 0.017 |
| Tellurium Metal, Te | 0.04 |

Treatment

Pressure _____ Control to 20 atm. in a pressure vessel.
Rate of Temperature Elevation _____ 3° C./min. to 210° C.; 0.3° C./min. to 380° C.
Maintaining Time _____ 5 minutes at 380° C.

Purification

Washing with 20% $HNO_3$, water, and acetone in order.

Magnetization Characteristics

Saturation ($\delta_s$) _____ gauss__ 950
Remanence ($\delta_r$) _____ do____ 420
Coercive Force (Hc) _____ oe__ 307

EXAMPLE 28

| | Mole |
|---|---|
| Chromium Trioxide, $CrO_3$ | 1.0 |
| Thorium Nitrate, $Th(NO_3)_4$ | 0.05 |
| Nickel Nitrate, $Ni(NO_3)_2 \cdot 6H_2O$ | 0.08 |
| Sodium Bichromate, $Na_2Cr_2O_7 \cdot 2H_2O$ | 0.034 |
| Antimony Oxide, $Sb_2O_3$ | 0.017 |
| Tellurium Metal, Te | 0.04 |

Treatment

| | |
|---|---|
| Pressure | Control to 10 atm. in a pressure vessel. |
| Rate of Temperature Elevation | 3° C./min. to 210° C.; 0.3° C./min. to 395° C. |
| Maintaining Time | 30 min. at 395° C. |

Purification

Washing with 50% $HNO_3$, water, and acetone in order.

Magnetization Characteristics

| | | |
|---|---|---|
| Saturation ($\delta_s$) | gauss | 963 |
| Remanence ($\delta_r$) | do | 396 |
| Coercive Force (Hc) | oe | 275 |

EXAMPLE 29

| | Mole |
|---|---|
| Chormium Trioxide, CrO | 1.5 |
| Barium Chromate, $BaCrO_4$ | 0.1 |
| Nitric Acid, 30% $HNO_3$ | 0.25 |
| Cuprous Nitrate, $Cu(NO_3)_2 \cdot 3H_2O$ | 0.50 |
| Cesium Nitrate, $CsNO_3$ | 0.04 |
| Antimony Oxide, $Sb_2O_3$ | 0.017 |
| Tellurium Metal, Te | 0.04 |

Treatment

| | |
|---|---|
| Pressure | Control to 10 atm. in a pressure vessel while introducing oxygen gas. |
| Rate of Temperature Elevation | 3° C./min. to 210° C.; 0.3 C./min. to 390° C. |
| Maintaining Time | 30 min. at 390° C. |

Purification

Washing with 15% $HNO_3$, water, and acetone in order.

Magnetization Characteristics

| | | |
|---|---|---|
| Saturation ($\delta_s$) | gauss | 960 |
| Remanence ($\delta_r$) | do | 440 |
| Coercive Force (Hc) | oe | 295 |

What is claimed is:

1. A process for preparing a ferromagnetic chromium dioxide having a rutile-type crystal structure, said process producing said ferromagnetic chromium dioxide independently of the pressure existing during said process, said process comprising calcining a dry mixture which consists essentially of chromium oxide and at least 0.01 mole per mole of said chromium oxide of a nitrate selected from the group consisting of calcium nitrate, barium nitrate, strontium nitrate, lead nitrate and mixtures thereof at a temperature of from 350 to 500 C. at atmospheric pressure, the chromium of said chromium oxide having an average valence of greater than 4, to thereby produce said ferromagnetic chromium dioxide.

2. The process for preparing a ferromagnetic chromium dioxide as set forth in claim 1, wherein said chromium oxide is chromium trioxide.

3. The process for preparing a ferromagnetic chromium dioxide as set forth in claim 1 wherein said calcination is carried out for from 0.5 to 50 hours.

4. The process of claim 1 wherein said mixture is obtained by mixing and reacting nitric acid and an amount of fro mthe stoichiometric amount, necessary to form chromium trioxide, to 4 times said stoichiometric amount of at least one member selected from the group consisting of the chromates and bichromates of calcium, barium, strontium and lead.

5. The process of claim 4 wherein chromium oxide is added to the mixture of nitric acid and said member, the chromium of said chromium oxide having an average valence of greater than 4.

6. The process of claim 1 further comprising purifying the chromium dioxide resulting from said calcination by washing said chromium dioxide, successively, with a mineral acid, water and an organic solvent.

7. The process of claim 6 wherein said mineral acid is nitric acid and wherein said organic solvent is acetone.

8. The process for preparing a ferromagnetic chromium dioxide as set forth in claim 1 wherein the amount of said nitrate is from 0.05 to 0.5 mole per mole of chromium oxide.

9. A process for preparing a ferromagnetic chromium dioxide having a rutile-type crystal structure, said process producing said ferromagnetic chromium dioxide independently of the pressure existing during said process, said process comprising calcining a dry mixture which consists essentially of chromium oxide, at least 0.01 mole per mole of said chromium oxide of a nitrate selected from the group consisting of calcium nitrate, barium nitrate, strontium nitrate, lead nitrate and mixtures thereof, from 0.001 to 0.5 mole per mole of chromium oxide of a first improving agent and from 0.001 to 0.5 mole per mole of chromium oxide of a second improving agent, at a temperature of from 350 to 500° C. at atmospheric pressure, the chromium of said chromium oxide having an average valence of greater than 4, said first improving agent consisting essentially of a component having the function of improving the crystal form of chromium dioxide selected from the group consisting of lithium, potassium, sodium, rubidium and cesium, and their chromates, bichromates, nitrates, oxides, halogenates and per-halogenates, said second improving agent consisting essentially of a component having the function of improving the magnetic characteristics of chromium dioxide, selected from the group consisting of antimony, tellurium, chromium, manganese, iron, cobalt, thallium, titanium, vanadium, bismuth, cadmium, germanium, tin, molybdenum, oxides thereof, fluorides of iron, cobalt, nickel and magnesium, and sulfates of manganese, cobalt, chromium, and nickel, to thereby produce said ferromagnetic chromium dioxide.

10. The process for preparing a ferromagnetic chromium dioxide as set forth in claim 9 wherein
(1) said first improving agent is a nitrate, a chromate, bichromate or an oxide of lithium, sodium or potassium;
(2) said second improving agent is antimony, tellurium or tin or an oxide thereof; and
(3) the amount of each of said first improving agent and said second improving agent is 0.05–0.5 mole per mole of chromium oxide.

11. The process of claim 9 wherein said mixture is obtained by first mixing and reacting nitric acid and an amount of from the stoichiometric amount, necessary to form chromium trioxide, to 4 times said stoichiometric amount of at least one member selected from the group consisting of the chromates and bichromates of calcium, barium, strontium and lead and the resulting product is uniformly blended, before calcination, with said first and said second improving agents.

12. A process for preparing a ferromagnetic chromium dioxide having a rutile-type crystal structure comprising calcining a dry mixture which consists essentially of chromium oxide and at least 0.01 mole per mole of chromium oxide of a nitrate selected from the group consisting of calcium nitrate, barium nitrate, strontium nitrate, lead nitrate and mixtures thereof at a temperature of from 250 to 500° C. at a super-atmospheric pressure of up to 20 atmospheres, the chromium of said chromium oxide having an average valence of greater than 4, to thereby produce said ferromagnetic chromium dioxide.

References Cited
UNITED STATES PATENTS

| | | | |
|---|---|---|---|
| 2,923,683 | 2/1960 | Ingraham et al. | 252—62.51 |
| 3,002,815 | 10/1961 | Heinze | 423—607 |
| 3,034,988 | 5/1962 | Ingraham et al. | 252—62.51 |
| 3,117,093 | 1/1964 | Arthur et al. | 252—62.51 |
| 3,371,043 | 2/1968 | Hund et al. | 252—62.51 |
| 3,547,824 | 12/1970 | Mihara et al. | 252—62.51 |
| 3,583,917 | 6/1971 | Mihara et al. | 252—62.51 |
| 3,574,115 | 4/1971 | Haines | 252—62.51 |

OSCAR R. VERTIZ, Primary Examiner

J. COOPER, Assistant Examiner

U.S. Cl. X.R.

423—607